Jan. 5, 1960   C. J. BARTON ET AL   2,920,024
MOLTEN FLUORIDE NUCLEAR REACTOR FUEL
Filed July 27, 1956
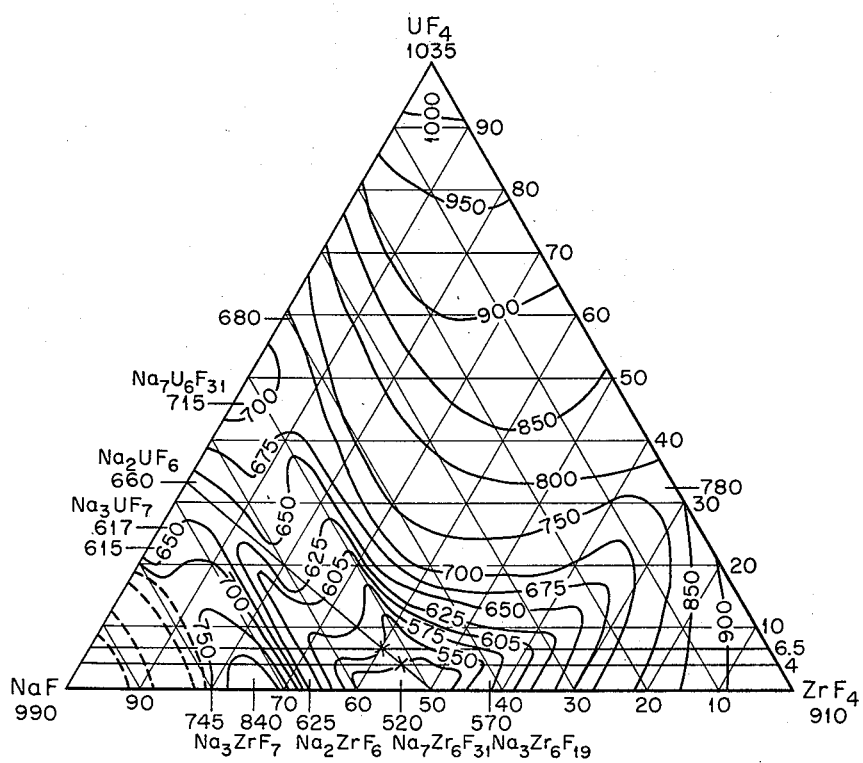
INVENTORS
Charles J. Barton &
Warren R. Grimes
BY
*Roland A. Anderson*
ATTORNEY

United States Patent Office 2,920,024
Patented Jan. 5, 1960

2,920,024

MOLTEN FLUORIDE NUCLEAR REACTOR FUEL

Charles Julian Barton and Warren R. Grimes, Oak Ridge, Tenn., assignors to the United States of America as represented by the United States Atomic Energy Commission Application July 27, 1956, Serial No. 600,639

9 Claims. (Cl. 204—193.2)

The present invention relates in general to a fuel system for a neutronic reactor, and more particularly to a molten salt fuel system for such reactors.

For information concerning the theory, construction, and operation of neutronic reactors, reference is made to the following publications: Glasstone and Edlund, The Elements of Nuclear Reactor Theory; Glasstone, Principles of Nuclear Reactor Engineering; The Reactor Handbook (3 volumes, AECD–3645, 3646 and 3647), for sale by the Superintendent of Documents, U.S. Government Printing Office, Washington, D.C.; and to the basic reactor patent of Fermi and Szilard, U.S. Patent 2,708,656, entitled "Chain Reactions."

Heretofore, fuel systems for neutronic reactors have been, broadly speaking, of two general types: (1) solid uranium fuel elements, a plurality of which are distributed in a fixed spacial configuration in a moderator matrix as the active portion of a heterogeneous reactor; and (2) aqueous homogeneous solutions of a uranyl salt, such as was employed in the Los Alamos water boiler and the Oak Ridge homogeneous reactor experiment reactors.

In the case of the solid fuel element, numerous compositions and shapes are possible, several examples being a uranium metal slug encased in a cylindrical aluminum jacket; assemblies of flat or curved plates of a uranium-aluminum alloy, or of a uranium oxide dispersion in an aluminum matrix, sandwiched between plates of aluminum; and a uranium oxide dispersion in a stainless steel matrix, sandwiched between plates of stainless steel. The concentration of the slow-neutron-fissionable uranium-235 varies from the natural isotopic concentration to high degrees of enrichment, and the amount of the uranium in the fuel element also varies, depending upon the intended reactor application. The jacketing or cladding of the uranium fuel is necessary to prevent corrosion or erosion of the uranium, and also to prevent escape of radioactive fission products into the coolant stream or other environs of the reactor. The fabrication of such uranium fuel elements is difficult and expensive. The decontamination of the uranium from fission products, which compete with the fissionable material for available neutrons, obviously cannot be continuously performed; periodic removal of the fuel element from the reactor for decontamination is therefore necessary. Decontamination is normally accomplished by separating the uranium from the jacketing material by chemical dissolution, and subjecting the resulting uranium-fission product solution to an organic solvent extraction processing. This is time consuming and costly, and the inventory charges of the expensive fissionable material during chemical processing against the particular reactor greatly increases the cost of its operation. These difficulties associated with the fabrication and decontamination of solid fuel elements have long been recognized as a serious drawback to heterogeneous solid fuel element reactors.

In the aqueous homogeneous reactor, the problem of fuel element fabrication is eliminated and decontamination from fission products, especially gaseous fission products, is considerably ameliorated by using the uranium either as a solution of uranyl sulfate or uranyl nitrate or as a slurry of uranium oxide. Heat exchange problems are also diminished, since the aqueous fuel, itself can be withdrawn from the active core system, circulated through an external heat exchanger, and then returned to the core. However, aqueous systems, in turn, raise difficulties not associated with heterogeneous reactors. For example, water undergoes radiolytic decomposition into hydrogen and oxygen, requiring removal of the gases and their catalytic or thermal recombination. Also serious corrosion problems are introduced. Perhaps the most serious difficulty associated with this type of reactor is the low boiling point of water. Pressure vessels are consequently required to maintain the water in liquid form at the elevated temperatures required for thermodynamic efficiency in power generation. When expensive heavy water is employed, additional elaborate means must be used to prevent any of its loss.

With this background, the need long felt in the art for improved reactor fuels can be well appreciated. The desirability of a reactor fuel having the fabricational, heat exchange, and decontamination simplicity of the aqueous homogeneous sytems, while yet permitting operation at substantially atmospheric pressure and at low corrosion rates is quite apparent. Suggestions have been made for the employment of fuel systems of molten metals, hydroxides, and inorganic salts. For most reactor applications, numerous stringent requirements must be met for a satisfactory molten circulating fuel, and prior to the present invention such a fuel has not been available. In part, this is because much information concerning the fundamental properties of such materials at elevated temperatures and the details of their technology is fragmentary, completely lacking, or unreliable. Among the numerous desirable characteristics of a satisfactory molten, circulating fuel are: low parasitic neutron absorption cross section, relatively low melting point, low viscosity, high heat capacity and thermal conductivity, high thermal expansion coefficient (to furnish a negative component to the temperature coefficient of reactivity and thereby simplify reactor control), low corrosive action at elevated temperature, high radiation stability, satisfactory uranium solvent ability, low vapor pressure, and a neutron slowing down (moderating) power sufficient for the desired application.

In view of the urgent need for improved reactor fuels, an object of the present invention is to provide an improved reactor fuel composition.

Another object is to provide an inorganic salt composition of excellent physical and chemical properties in the molten state, and capable of functioning as a molten, circulating fuel medium in a neutronic reactor.

Another object is to provide a mixture of inorganic halide salts of excellent physical and chemical properties in the molten state, capable of serving as a molten, circulating fuel medium in a neutronic reactor.

Other objects and advantages of the invention will become apparent to those skilled in the art from the following detailed description and the claims appended hereto.

The single drawing is a triangular phase diagram of a preferred three component reactor fuel composition embodying the present invention.

In accordance with the present invention there is provided an improved fuel composition for a neutronic reactor, which comprises a molten mixture of zirconium tetrafluoride, at least one alkali metal fluoride, and at least one uranium fluoride selected from the group consisting of uranium trifluoride and uranium tetrafluoride. Such a reactor fuel composition has proven to be one of the more important reactor developments of recent years, many of the drawbacks of prior fuels having been overcome by this development. Our composition can be easily continuously removed and reprocessed; difficult problems of fuel element fabrication are avoided; to the extent that fission products may be removed automatically and continuously (the notorious xenon-135 is fortunately not appreciably soluble in the melt and passes out without special effort) improved neutron economy is afforded and complete decontamination is less frequently required; and because the fuel can be circulated to a heat exchanger, heat removal problems are considerably simplified. In addition, the high thermal expansion coefficient of the liquid furnishes a negative temperature coefficient of reactivity, and neutron moderation capacity is obtained from the fluorine atoms, and also from the lithium, sodium, and potassium atoms, when employed. The system displays excellent physical properties, considering the numerous, often diverse properties desired; the total parasitic neutron cross section, melting point, corrosive action, vapor pressure, and viscosity are all remarkably low (e.g., melting points well under 500° C. have been obtained, vapor pressure is only a few mm. Hg at 800° C., and viscosity is well under 10 centipoises at 700° C.), and the heat capacity, thermal conductivity, and radiation stability are all remarkably high.

The present fuel composition is not restricted in its application to any single reactor design. It has successfully been employed in a heterogeneous circulating fuel reactor which operated over a considerable period of time, and it has undergone successful testing in a critical assembly experiment of a strictly homogeneous reactor design.

The selection of the particular alkali metal fluoride to be used with the zirconium and uranium fluorides in the fuel composition is subject to considerable variation, and may depend, in a given case, on the amount of moderating capacity desired, the lower atomic weight atoms, of course, providing a greater degree of moderation. A single alkali metal fluoride or a combination of alkali metal fluorides may be satisfactorily employed. With lithium fluoride, it is preferred that the low neutron cross-section lithium-7 isotope be employed. Lithium-7 may be separated from lithium-6 by conventional methods, including ion exchange and chemical exchange.

Several examples of suitable fuel compositions are the following:

$LiF$—$ZrF_4$—$UF_4$
$NaF$—$KF$—$ZrF_4$—$UF_4$
$NaF$—$LiF$—$ZrF_4$—$UF_4$
$NaF$—$RbF$—$ZrF_4$—$UF_4$
$NaF$—$LiF$—$KF$—$ZrF_4$—$UF_4$
$NaF$—$ZrF_4$—$UF_4$
$RbF$—$ZrF_4$—$UF_4$

The alkali fluoride content and the zirconium fluoride content of the fuel may each satisfactorily vary over a considerable range. In particularly suitable compositions, the zirconium tetrafluoride and alkali fluoride may each comprise approximately 36–65 mole percent, while the uranium fluoride content is considerably smaller, say between 2–20 mole percent. The exact uranium content employed in a particular application may depend upon a number of factors, such as the concentration of the other constituents, the operating temperature and geometry of the reactor, the degree of enrichment with respect to uranium-235, and the fission product poison fraction. In view of the relatively low solubility of uranium fluoride in the fluoride melt at reasonable temperatures and the desirability of achieving criticality in a minimum volume, especially for mobile reactors such as propulsive units for aircraft, highly enriched uranium is usually desirable.

While all the above compositions are generally satisfactory, the single preferred fuel system is the $NaF$—$ZrF_4$—$UF_4$ system. The melting point temperature contour diagram of this system is shown in the accompanying drawing. Temperatures are given on the centigrade scale and a number of binary uranium-sodium and sodium-zirconium fluoride compounds are indicated. Examination of this phase diagram reveals that a number of low melting, useful fuel compositions are available in the region containing approximately 33–60 mole percent sodium fluoride, 20–65 mole percent zirconium fluoride, and about 4–20 mole percent uranium. Two particularly useful relatively low melting point compositions contain, by mole, 50% $NaF$—46% $ZrF_4$—4% $UF_4$ and 53% $NaF$—41% $ZrF_4$—6% $UF_4$. The tables below are offered to show various characteristics of several fuel compositions falling within the scope of the invention. Tables I, II and III indicate the effect on the melting point of varying the percentage composition of the constituents in a given fuel system. Table IV shows the physical properties of several representative compositions.

TABLE I

Melting points of $NaF$—$KF$—$ZrF_4$—$UF_4$ mixtures containing 4 mole percent $UF_4$

| Composition (mole percent) | | | First Break Temperature (° C.) |
| --- | --- | --- | --- |
| NaF | KF | ZrF4 | |
| 7.7 | 40.3 | 48.0 | 668 |
| 8.2 | 44.6 | 43.2 | 540 |
| 4.8 | 50.0 | 41.2 | 540 |
| 9.1 | 48.5 | 38.4 | 490 |
| 9.6 | 52.8 | 33.6 | 585 |
| 15.4 | 32.6 | 48.0 | 615 |
| 17.3 | 35.5 | 43.2 | 565 |
| 18.7 | 38.9 | 38.4 | 575 |
| 20.2 | 42.2 | 33.6 | 555 |
| 22.9 | 22.6 | 50.5 | 620 |
| 24.9 | 25.6 | 45.5 | 565 |
| 27.8 | 27.4 | 40.8 | 490 |
| 29.8 | 30.2 | 36.0 | 535 |
| 30.1 | 15.4 | 50.5 | 605 |
| 33.7 | 16.8 | 45.5 | 550 |
| 34.6 | 17.3 | 44.1 | 545 |
| 36.7 | 18.5 | 40.8 | 515 |
| 39.8 | 20.2 | 36.0 | 540 |
| 36.5 | 13.5 | 46.0 | 540 |
| 52.8 | 9.6 | 33.6 | 545 |

TABLE II

Effect of $UF_4$ on the melting point of a $NaF$—$KF$—$ZrF_4$ mixture

| Composition (mole percent) | | | | Break Temperatures [1] (° C.) |
| --- | --- | --- | --- | --- |
| NaF | KF | ZrF4 | UF4 | |
| 36 | 18 | 46 | 0 | 440, 425, 395 |
| 34.6 | 17.3 | 44.1 | 4.0 | 545, 493, 412 |
| 32.4 | 16.2 | 41.4 | 10.0 | 553, 505, 465, 405 |
| 30.6 | 15.3 | 39.1 | 15.0 | 585, 575, 500, 395 |
| 28.8 | 14.4 | 36.8 | 20.0 | 626, 580, 480, 400 |
| 27.0 | 13.5 | 34.5 | 25.0 | 663, 575, 495 |

[1] Highest break temperature considered most reliable indication of melting point.

TABLE III

Effect of $UF_4$ on melting point of $NaF$—$RbF$—$ZrF_4$ mixtures

| Composition (mole percent) | | | | First Break Temperature (° C.) |
| --- | --- | --- | --- | --- |
| NaF | RbF | ZrF4 | UF4 | |
| 35.0 | 20.0 | 45.0 | 0 | 445 |
| 34.3 | 19.6 | 44.1 | 2.0 | 480 |
| 34.0 | 19.4 | 43.6 | 3.0 | 540 |
| 33.6 | 19.2 | 43.2 | 4.0 | 575 |
| 10.0 | 45.0 | 45.0 | 0 | 445 |
| 9.6 | 43.2 | 43.2 | 4.0 | 485 |

TABLE IV
*Physical properties of representative fuels*

| Composition | Approximate Melting Point, °C. | Heat Capacity, cal., gm. °C. | Thermal Conductivity, B.t.u., hr. ft.² (° F./ft.) | Viscosity Centipoises | | Density, gm./cc. (T=° C.) |
|---|---|---|---|---|---|---|
| | | | | | °C. | |
| NaF—50 Mole Percent<br>ZrF₄—46 Mole Percent<br>UF₄—4 Mole Percent | 520 | 0.26 at 700° C. | 1.5 | 9.3<br>6.05<br>4.25 | 600<br>700<br>800 | $\rho=3.93-.00093\ T$ |
| NaF—53.5 Mole Percent<br>ZrF₄—40 Mole Percent<br>UF₄—6.5 Mole Percent | 540 | 0.24 | 1.2 | 8.5<br>5.6<br>4.0 | 600<br>700<br>800 | $\rho=4.04-.0011\ T$ |
| LiF—55 Mole Percent<br>NaF—20 Mole Percent<br>ZrF₄—21 Mole Percent<br>UF₄—4 Mole Percent | 545 | 0.33 | | 12.0<br>7.0<br>4.45 | 600<br>700<br>800 | $\rho=3.49-.00085\ T$ |
| RbF—48 Mole Percent<br>ZrF₄—48 Mole Percent<br>UF₄—4 Mole Percent | 425 | 0.21 | 1.2 | 7.2<br>4.7<br>3.3 | 600<br>700<br>800 | $\rho=4.00-.00093\ T$ |
| NaF—50 Mole Percent<br>ZrF₄—25 Mole Percent<br>UF₄—25 Mole Percent | 610 | 0.27 | | 8.5<br>5.0<br>3.5 | 700<br>800<br>900 | $\rho=5.09-.00159\ T$ |
| KF—50.1 Mole Percent<br>NaF—4.8 Mole Percent<br>ZrF₄—41.3 Mole Percent<br>UF₄—3.8 Mole Percent | 540 | 0.28 | | | | $\rho=4.27-.00163\ T$ |

While the formation of firm generalizations is difficult in view of the extremely complex chemistry of molten fluoride systems, it would appear that the effect of increased uranium is to increase the melting point, density, and vapor pressure of the system, and to decrease the heat capacity. Increased alkali content, at the expense of zirconium, tends to decrease the melting point and viscosity but to increase corrosion. The addition of alkali metals of greater molecular weight usually decreases the melting point, viscosity and heat capacity.

The fuel composition may be prepared from the constituent compounds by various methods and the choice of particular method is not critical. Alkali metal fluorides and zirconium tetrafluoride are, of course, generally commercially available, and may be prepared by the methods indicated in Mellor, Treatise on Inorganic and Theoretical Chemistry, while $UF_4$ and $UF_3$ suitable for use in our invention may be prepared by the methods indicated in Mellor and in Katz and Rabinowich, The Chemistry of Uranium. In one method of preparing the fuel, the individual pure alkali fluorides, zirconium tetrafluoride, and uranium fluoride may simply be mixed and melted together at an elevated temperature under an inert atmosphere, such as helium. Upon cooling, the melt forms a solid fused mass. In actual reactor operation, it may be preferred to prepare the fuel in two parts, the fuel solvent and the fuel concentrate. The fuel solvent comprises a mixture or compound of the alkali fluoride(s) and zirconium tetrafluoride, while the fuel concentrate comprises a mixture or compound of the alkali fluoride(s) and the uranium fluoride. When using the NaF—$ZrF_4$—$UF_4$ system, the solvent may comprise any mixture or compound shown on the NaF—$ZrF_4$ line of the phase diagram, while the concentrate may comprise any mixture or compound on the NaF—$UF_4$ line. In a preferred method of preparing the NaF—$ZrF_4$—$UF_4$ fuel in this way, NaF and $ZrF_4$ are first mixed together in equimolar amounts, melted and circulated through the reactor. The NaF—$ZrF_4$ mixture, in equimolar amounts, has a melting point of about 510° C. To the fuel solvent may then be added the fuel concentrate, NaF—$UF_4$, which, in a 2:1 sodium to uranium mole ratio, forms the binary compound $Na_2UF_6$, having a melting point of about 660° C. This latter method of forming the fuel seems to have a number of advantages, one being that it provides a safe, incremental approach to criticality which is especially valuable in a new reactor where the precise critical point is never exactly known beforehand, and another being that it permits the introduction of additional reactivity into an operating system.

While these $UF_4$-bearing melts do not pose excessive corrosion problems, particularly in containers of Inconel and Hastelloy alloys, it may be preferred for some applications to further reduce corrosion by the substitution of $UF_3$ for at least some $UF_4$ in the fuel compositions. Thus, $UF_3$ can be substituted for $UF_4$ in any of the foregoing fuel compositions. Compared with $UF_4$, $UF_3$ causes less corrosion, but on the debit side, is undesirably less soluble in the fuel solvent and tends to disproportionate into U and $UF_4$ at temperatures in the region of 650° C. While $UF_3$ might be used to completely replace the $UF_4$, it is preferred, when $UF_3$ is employed, to employ the two uranium fluorides together rather than $UF_3$ alone, thereby reducing corrosion while minimizing the disproportionation reaction. The $UF_4$—$UF_3$ ratio in such melts may satisfactorily vary, but we find that a mole ratio of about 75% $UF_4$ to 25% $UF_3$ is about optimum. Generally, however, we prefer to employ the $UF_4$ alone. In addition to the methods indicated by Katz and Rabinowich, $UF_4$ may be nearly quantitatively converted to $UF_3$ by reacting finely divided uranium metal and $UF_4$ at 900° C. while being rotated in a sealed steel capsule containing steel balls. The reaction is conducted for about 24–32 hours in an inert atmosphere. In practical operation, $UF_4$ may be reduced to $UF_3$ in the fuel melt itself by adding metallic uranium, zirconium, or alkali to the melt, uranium being preferred.

In the event that the fuel constituents contain small amounts (a few parts per million) of impurities such as $SO_4$, $ZrOF_2$, $ZrO_2$, Fe, $H_2O$ and $UO_2F_2$, these may be removed according to the method of the co-pending application of the common assignee, Ser. No. 716,249, filed February 19, 1958, in the name of Warren R. Grimes for "Purification of Reactor Fuels." Briefly, this method comprises melting the composition under an atmosphere of HF, subjecting the resulting fluoride melt to consecutive treatment at approximately 1500° F. with hydrogen, hydrogen fluoride, and hydrogen, and then flushing the resulting melt of any occluded gases with an inert gas to complete the purification of said mixture.

The preferred NaF—$ZrF_4$—$UF_4$ system was successfully employed as the fuel composition in a reactor which was run for 221 hours in November 1954 at the Oak Ridge National Laboratory, as described in detail in Report Ornl-1845. This reactor was a thermal, circulating fuel, solid beryllium oxide reflected and moderated reactor. The primary coolant was the circulating fuel itself, the reflector coolant was sodium, and the primary heat flow was fuel to helium to water. The total volume of BeO in the core and reflector was 32.23 ft.³ for a total weight of 5538 pounds. The Inconel core contained 1.37 ft.³ of fuel, when hot. The uranium consumption at a power of 1.5 megawatts was 1.5 grams per day. At 1.5 mw., the fuel inlet temperature was 1315° F. and the fuel outlet temperature was 1480° F. The fuel flowed through BeO blocks in the reactor core in a plurality of connected, narrow Inconel tubes at a rate of 68 grams per minute.

The fuel composition for the start-up of the reactor was prepared by circulating the fuel carrier, NaF–ZrF$_4$ in equimolar amounts, through the reactor in a helium atmosphere and then adding to it the fuel concentrate, Na$_2$UF$_6$, until the reactor became critical. The uranium enrichment was 93.4% U–235. The reactor became critical with a mass of 32.8 pounds of U–235, which gave a concentration of 23.9 pounds of U–235 per ft.$^3$ of fluoride fuel. For operation at full power, the U–235 content of the fuel was increased to 26.0 lb./ft.$^3$, and thus the final composition of the fuel was 53.09% NaF—40.73% ZrF$_4$—6.18% UF$_4$. The physical properties of the fuel carrier and concentrate and of the final fuel composition are shown in the table below:

TABLE V
*Physical properties of fuel composition*

| | Melting Point (° C.) | Thermal Conductivity (B.t.u./hr. ft. ° F.) | Viscosity (cp.) | Heat Capacity (B.t.u./lb. ° F.) | Density (g./cm.$^3$) |
|---|---|---|---|---|---|
| Fuel Carrier: NaF—ZrF$_4$, 50–50 mole percent | 510 | 2.5 ª | 8.0 at 600° C.<br>5.3 at 700° C.<br>3.7 at 800° C. | ª 0.30 | $\rho=3.79-0.00093\ T$<br>$600<T<800°$ C. |
| Fuel Concentrate: NaF—UF$_4$(Na$_2$UF$_6$), 66.7–33.3 mole percent. | 635 | 0.5 estimated | 10.25 at 700° C.<br>7.0 at 800° C.<br>5.1 at 900° C. | ª 0.21 | $\rho=5.598-0.00119\ T$<br>$600<T<800°$ C. |
| Fuel: NaF—ZrF$_4$—UF, 53.09–40.73–6.18 mole percent. | 530 | 1.3 estimated | 8.5 at 600° C.<br>5.7 at 700° C.<br>4.2 at 800° C. | ª 0.24 | $\rho=3.98-0.00093\ T$<br>$600<T<800°$ C. |

ª Preliminary values at 600–800° C.

It will be apparent that the above illustrated use of the present fuel composition is merely illustrative and not restrictive. The fuel composition may be used in reactors of various design, and is not limited in applicability to any particular design. For example, the fuel composition may be encapsuled in small rods or tubes and used as fixed fuel elements in a heterogeneous reactor. Also the fuel composition could be employed in a strictly homogeneous circulating fuel reactor. Since the invention is inherently of wide applicability, it is intended to be limited only as is indicated by the appended claims.

What is claimed is:

1. A neutronic reactor fuel composition consisting essentially of a molten mixture of at least one alkali fluoride, zirconium tetrafluoride, and at least one uranium fluoride selected from the group consisting of uranium tetrafluoride and uranium trifluoride.

2. The fuel composition of claim 1, wherein said alkali fluoride is sodium fluoride and said uranium fluoride is uranium tetrafluoride.

3. The fuel composition of claim 1, wherein said alkali fluoride is lithium fluoride.

4. The fuel composition of claim 1, wherein said alkali fluoride comprises sodium fluoride together with potassium fluoride.

5. The fuel composition of claim 1, wherein said alkali fluoride comprises sodium fluoride together with rubidium fluoride.

6. A neutronic reactor fuel composition comprising a molten mixture of approximately 33–60 mole percent sodium fluoride, 20–65 mole percent zirconium tetrafluoride, and 2–20 mole percent of at least one uranium fluoride selected from the group consisting of uranium tetrafluoride and uranium trifluoride.

7. The fuel composition of claim 6, wherein said uranium fluoride is uranium tetrafluoride.

8. The fuel composition of claim 7, wherein said sodium fluoride comprises approximately 53 mole percent, said zirconium tetrafluoride comprises approximately 41 mole percent, and said uranium tetrafluoride comprises approximately 6 mole percent.

9. The fuel composition of claim 7, wherein said sodium fluoride comprises approximately 50 mole percent, said zirconium fluoride comprises approximately 46 mole percent, and said uranium tetrafluoride comprises approximately 4%.

References Cited in the file of this patent

UNITED STATES PATENTS 2,853,446   Abbott et al. _____ Sept. 23, 1958

OTHER REFERENCES

"Nucleonics," vol. 15, No. 8, August 1957, pp. 64–65.
Briant et al.: "Nuclear Science and Engineering," November 1957, pages 797–803.